March 10, 1942.  W. D. BAYLEY  2,275,943

WINDOW ASSEMBLY

Filed Aug. 16, 1938

INVENTOR
William D. Bayley
BY
Henry G. Dylvig
ATTORNEY

Patented Mar. 10, 1942

2,275,943

UNITED STATES PATENT OFFICE 2,275,943

WINDOW ASSEMBLY

William D. Bayley, Springfield, Ohio

Application August 16, 1938, Serial No. 225,205

7 Claims. (Cl. 189—36)

This invention relates to window assemblies and more particularly to the uniting of the muntin bars constituting the frame of the window.

An object of this invention is to provide a welded joint for muntin bars that is easily made, strong, resistant to torsional forces, economically produced, requiring a small amount of fusing material considering the strength of the joint, resulting in a dependable and neat structure.

Another object of this invention is to provide recesses in the parts to be welded, which recesses are adapted to receive the fusing material without the use of retaining blocks.

Another object of this invention is to provide a weld for uniting the flanges of T-shaped muntin bars, wherein the corners between the transversely disposed muntin bars are clean cut.

Another object of this invention is to provide a kidney-shaped or reniform opening or recess for receiving the weld, wherein the main body portion of the opening is in one member and the lobes project into the other member.

Another object of this invention is to provide a weld for uniting muntin bars wherein the same weld unites the two muntin bars and an interlocking member into a unitary structure.

Another object of this invention is to provide a weld that does not interfere with the glazing of the window.

Another object of this invention is to provide a structure wherein two parts are interconnected by a weld, the two parts being transversely disposed, so as to provide four corners, the weld being located in only one corner.

Another object of this invention is to provide a weld traversing the slot normally found between the flanges of one bar abutting the flanges of the other bar extending continuously through the joint, so as to deter sawing of the bars at this more vulnerable portion of the joint.

Other objects and advantages reside in the construction of parts, the combination thereof and the mode of operation, as will become more apparent from the following description.

In the drawing, Figure 1 is a fragmentary perspective view of the joint.

Figure 1:
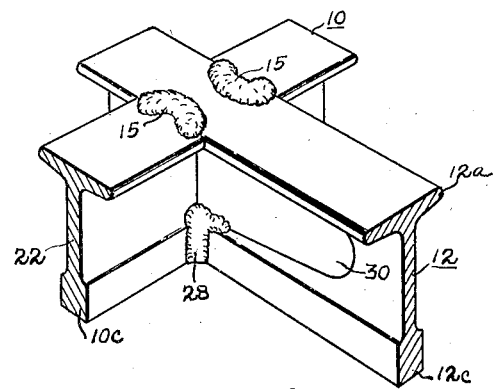

This invention is a development closely related to the disclosure in my Patent No. 2,090,884 patented August 24, 1937 for Interlocking sash joint.

In the manufacture of windows it is very desirable to produce a finished structure wherein all surfaces are finished, without showing any irregularities usually found in welding joints. That being the case, it is very desirable to produce a welded joint wherein the exposed surfaces of the weld may easily be finished with a minimum amount of labor and time.

In the welded joint disclosed herein, this has been accomplished by providing recesses or openings for the weld uniting the flanges of interlocking or intersecting T-shaped bars, which recesses are of such a shape and such a contour that the weld does not extend to the edges of the flanges of the muntin bars. This results in clean corners. As the weld is confined to one surface, it is readily polished.

The particular type of a recess that has been shown is kidney-shaped, or reniform, wherein the main body of the kidney-shaped recess is located in the flange of one bar and the lobes of the recess project into the other bar. This insures a strong joint. Furthermore, the corners of the material forming the boundary for the recess project into the recess so as to form a good fusion between the fusing material and the material of the muntin bars. The corners projecting into the recess melt more readily than the main body portion, thereby resulting in a better union between the fused material and the material of the bars.

In order to eliminate the use of copper blocks commonly used when welding, the recesses have been provided with bevelled walls, or are, so to speak, partially dished, so as to provide a cavity forming a seat for the welding material. The hole is preferably sunken into one of the bars above the web, so that the weld in addition to engaging the flanges along the sides of the hole, also engages or forms a union with the web of one of the bars. This results in a sturdy weld, in that the weld is united to the bevelled edges surrounding the notches in the flanges and in addition thereto, it is united to the web of at least one of the bars.

By providing a kidney-shaped opening, the periphery of this opening is comparatively long, as compared to the required amount of fusing material. It results in a small quantity of fusing material being fused through a considerable area with the surrounding metal, thereby producing a very strong joint with a small quantity of fusing material.

Referring to the drawing, the welded joints include broadly two welds, (a) the welds reniform or kidney-shaped, used in uniting the flanges of the interlocking T-bars and (b) a single weld for each joint, used in uniting the ribs of the intersecting muntin bars and the interlocking member into a unitary structure, which joints will now be described.

In the drawing, the reference numeral 10 indicates a substantially T-shaped muntin bar of a window assembly, intersecting a transversely disposed T-shaped muntin bar 12. The flanges 10a of the muntin bar 10 have been cut away, so as to provide a clearance for the flange 12a of the muntin bar 12. This has been accomplished by providing an opening or an eye 12b in the muntin bar 12, which receives the muntin bar 10 in a manner similar to that disclosed in the William Bayley Patent No. 1,136,087 patented April 20, 1915, for Interlocking joint for sash bars. The flanges 10a are provided with shoulders 14 abutting the sides of the flanges 12a, that is, the flanges of the transversely disposed muntin bars.

Suitable notches are provided in the muntin bars so as to form kidney-shaped or reniform recesses for receiving the fused welding material. These openings include substantially C-shaped oppositely disposed notches 16 in the flanges 12a and arcuate notches 18 in the flanges 10a. The notches 16 terminate in points or projections 16a projecting towards the center of the notches 18. The portions 20 of the flanges 10a intermediate the notches 18, project into the C-shaped notches 16. This results in recessed substantially kidney-shaped, each provided with an irregular contour, so as to provide long weld engaging surfaces having a small quantity of welding material. In order to provide seats or supporting surfaces for the welding material, the walls of the C-shaped notches 16 and the walls of the notches 18, as well as the facet of the projecting portions 20, are all bevelled, resulting in recesses that are dished, thereby eliminating the use of the conventional copper welding blocks on the under side of the flanges.

In forming the notches 16 in the flanges 12a, these are formed by punches applied from the web side, the opposite faces of the flanges being supported upon matrices having a larger opening than the size of the punch, resulting in a jagged wall for each notch, that is, the walls are produced by tearing or fracturing. The notches 18 may be produced in a similar manner. The jagged or torn walls result in a better bond between the fusing material and the flanges. The dish-shaped notches form a basin, preventing the fusing material from flowing through to the opposite side.

The use of copper welding blocks tends to chill the fused material, that is, the blocks made from copper are good conductors of heat, resulting in the heat being dissipated too rapidly. By eliminating the necessity for the copper welding blocks on the under side of the flanges, the heat is utilized in heating the parts to be welded. The contour of the openings or notches in the flanges is such that the electric arc or current may be supplied to the fusing material without the current jumping across or arcing across to the walls of the slots. The opening is sufficiently large so as to permit the use of an electric weld without spoiling the weld by arcing. The notches being dish-shaped facilitates this welding operation. Thus, the dish shape of the notches, in addition to forming a cavity confining the weld to one side of the flanges, also facilitates the electric welding by reducing the arcing hazards.

Figure 2:
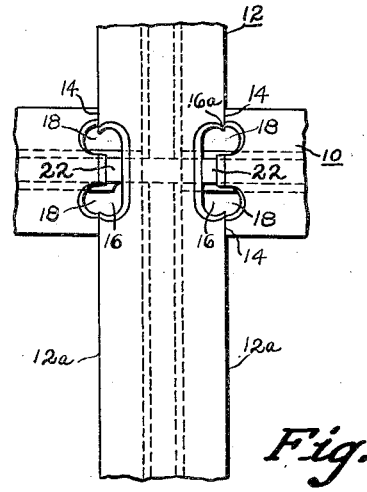
Figure 2 is a fragmentary face elevational view of the intersecting bars before welding.
Figure 4:
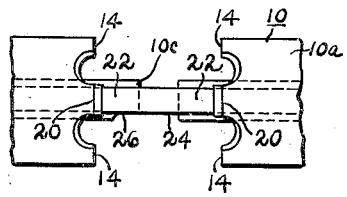
Figure 4 is a face elevational view of the other bar.
Figure 3:
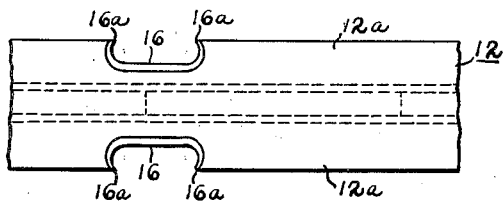
Figure 3 is a face elevational view of one of the bars.
Figure 7:
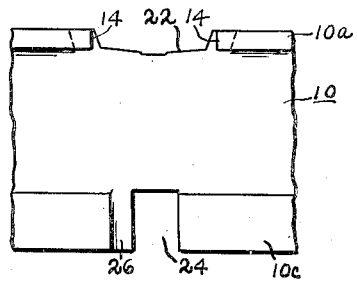
Figure 7 is a fragmentary view of the needle bar, showing the cut-out portion of the flanges and the cut-out portion of the rib.
Figure 6:
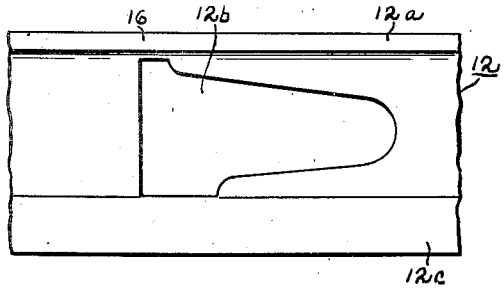
Figure 6 is a fragmentary view of the eye bar, showing the eye therein.
Figure 5:
Figure 5 is a perspective view of the interlocking member.

By referring to Figures 2 and 4 particularly, it can be readily seen that the web 22 of the muntin bar 10 underlies the weld and is united to the weld, thereby increasing the effectiveness of the weld and the rigidity of the welded bars. After the bars have been welded, it is merely necessary in order to produce a finished surface, to polish or finish the face of the weld, so as to reduce it to the same level or plane as the face of the flanges 10a and 12a. This is a comparatively simple operation. The corners formed by the intersecting muntin bars are not filled with welding material, thereby leaving clean corners that need not be finished after assembling the muntin bars.

The points projecting into the kidney-shaped openings are easily melted when welding the bars, thereby resulting in a better union and a quicker union than if no projections extended into the opening. The projections 20 extending, so to speak, into the weld, offer resistance against torsional movement or twisting of the muntin bars 10 relative to the muntin bars 12, a very desirable feature, especially where great strength is required, as for example, in detention windows and heavy duty commercial windows.

Another function of the inwardly projecting point 16a is to provide for sufficient tolerance, that is, if the notches are not accurately spaced with respect to the eye in the eye bar, the inwardly projecting point 16a provides sufficient tolerance so that the shoulders 14 may be shifted one way or the other without the kidney-shaped weld slug 15 extending into the corners between the flanges. It is very desirable that the two notches 18 be separated as far as possible to insure sufficient strength in the portion 20 projecting into these notches to strengthen the finished assembly in torsion. That being the case, it is very desirable to have the notches 18 extend outwardly towards the outer edges of the flanges 10a, there being only sufficient metal between the edges of the flanges 10a and the notches 18 to provide a wall for the weld and to provide a solid shoulder 14 abutting the sides of the flanges 12a. The kidney-shaped slugs 15 have the main body portion located in the C-shaped notch 16 in the flanges 12a and the lobes projecting into the notches 18 in the flanges 10a.

Thus, it is seen, that the kidney-shaped slugs 15 are disposed in aligned relation with respect to the juncture between the shoulders 14 and the flanges 12a. Without the welded slug traversing this line, it would be a comparatively easy matter to saw the bars at this more vulnerable area. However, due to the extreme hardness of the welding material, the slug deters the use of saws in cutting the welds along this line. The use of the kidney-shaped slugs in this location is especially desirable where the windows are to be used as detention windows or as security windows.

The rib 10c of the muntin bar 10 has been cut away or provided with a clearance 24 for the reception of the rib 12c of the muntin bar 12. In addition to the notch 24 in the rib 10c, this rib on one side of the muntin bar has been provided with a weld receiving groove or notch 26, receiving a weld 28, uniting the rib 10c to the rib 12c and uniting the interlocking delta-shaped member 30 into a unitary structure. Instead of one notch 26, for some constructions it may be desirable to notch both of the ends of the ribs 10c, so as to provide one weld on either side of the rib 12c. Ordinarily, it is not necessary to do so; but for extremely heavy duty work and for detention windows, increased strength may thus be obtained. By confining the welds 28 to one side of the rib 10c and only one side of the rib 12c, it can be readily seen that three corners between the ribs 10c and 12c have not been mutilated or disturbed in any manner by the weld 28. This leaves only one corner to be finished if it is found desirable to finish the corners.

If the welded corners are not finished, the glazing may be so inserted that the welds 28 do not interfere with the glazing operation, as three corners bounding an opening are clean, without any welds. Even if the welds 28 are located on both sides of the rib 12c, the opposite corners will be clean, without welds, so that two clean corners may be utilized for inserting the glazing without the welds 28 in any manner interfering with the glazing operation.

Instead of using the notch 26 in the side of the rib, the rib 12c may be provided with a hole, notch or transversely disposed V-shaped groove in the face opposite the flanges, the groove or notch extending across the rib so as to permit the fusing material uniting the ends of the rib 10c terminating in the notch 24 together, and to the rib 12c.

"Reniform or kidney-shaped" as used in the specification, is applied generically to a weld simulating a kidney-shaped structure or a crescent-shaped structure, or for that matter, a horseshoe-shaped or U-shaped structure. Within the purview of this invention may be included any type of a weld having an irregular contoured recess or a weld positioned in a dish-shaped recess or cavity, as defined in the appended claims.

Thus, a window is produced wherein the interlocking joints are strong, dependable and rigid, the welds being so positioned as to produce a strong joint without the welds in the flanges in any manner marring the corners between the flanges. These welds being located in one surface permit an easy polishing or finishing operation. The welds uniting the ribs are confined exclusively to one side of one of the ribs and in most cases to one side of both of the ribs of the interlocking muntin bars. This results in a juncture that does not interfere with the glazing operation of the window.

Although the preferred embodiment of the device has been described, it is within the purview of this invention to make various changes in the form, details, proportion and arrangement of parts, resulting in an article, device or mode of operation consistent with the invention disclosed herein and defined in the appended claims.

Having thus described my invention, I claim:

1. A window assembly including transversely arranged interlocking T-shaped muntin bars, the flanges of one bar continuing through the intersection of the bars, said continuous flanges being provided with substantially oppositely disposed C-shaped notches provided with bevelled walls, the flanges of the other bar being severed so as to provide shoulders abutting the uncut sides of the flanges of the first mentioned bar, the severed flanges being provided with a pair of arcuate openings arranged in spaced relation from each other and cooperating with the C-shaped notches to form substantially kidney-shaped openings, said arcuate openings being provided with bevelled walls so that the kidney-shaped openings are larger on the outside face of the flanges than on the inside thereof, and fusing material seated in the kidney-shaped openings for welding the flanges of the bars, said fusing material being inserted solely from one side of the opening during the welding operation.

2. A window assembly including transversely arranged interlocking T-shaped muntin bars, some of said T-shaped bars constituting I bars and others needle bars, the flanges of the I bar continuing through the intersection of the bars, said continuous flanges being provided with substantially oppositely disposed C-shaped notches provided with bevelled walls, the flanges of the needle bar being severed so as to provide shoulders abutting the uncut sides of the flanges of the I bar, the web of the needle bar extending continuously through the intersection and underlying the C-shaped notches so as to bottom the same, the severed flanges being provided with a pair of arcuate openings arranged in spaced relation from each other and cooperating with the C-shaped notches to form substantially kidney-shaped openings, said arcuate openings being provided with bevelled walls so that the kidney-shaped openings are larger on the outside face of the flanges than on the inside thereof, and fusing material seated in the kidney-shaped openings for welding the flanges of the bars, said fusing material being inserted solely from one side of the opening during the welding operation.

3. A window assembly including a pair of transversely arranged interlocking T-shaped muntin bars, one of which is a needle bar and the other an eye bar through which the needle bar extends, the flanges of the eye bar continuing through the intersection, said continuous flanges being provided with substantially oppositely disposed notches provided with bevelled walls, the flanges of the needle bar being severed, so as to provide shoulders abutting the uncut sides of the flanges of the eye bar, the web of the needle bar extending continuously through the intersection so as to bottom said notches, the severed ends of the flanges of the needle bar being provided with a pair of notches arranged in spaced relation from each other and cooperating with the notches in the eye bar to form weld receiving openings, said openings being provided with bevelled walls so that the openings are larger on the outside face of the flanges than on the inside thereof, and fusing material bottomed on the web of the needle bar for welding the flanges together, said fusing material being inserted solely from one side of the opening during the welding operation.

4. A window assembly including transversely arranged intersecting T-shaped muntin bars, the flanges of one bar extending through the joint of the bars, said continuous flanges being provided with substantially oppositely disposed notches, the flanges of the other bar being severed so as to form a transversely disposed notch, said severed flanges being provided with notches and having a central portion projecting into the notches of the continuous flanges but terminating in spaced relation from the bottom of said notches so as to provide a weld receiving seat, and a welding slug united to the projecting end of the severed flanges and the walls of the notches in the flanges extending through the joint.

5. A window assembly including transversely arranged intersecting T-shaped muntin bars, the flanges of one bar extending continuously through the joint of the bars, said continuous flanges being provided with substantially oppositely disposed notches, the flanges of the other bar being severed, a portion of the severed flanges projecting into the notches of the continuous bars but terminating in spaced relation from the bottom of said notches so as to form a weld receiving pocket, which pocket overlies the stem of said other bar, and a welding slug united to the end of said severed flanges and the sides of the notches in the continuous flanges to hold the bars in fixed relation relative to each other.

6. A joint structure for joining transversely arranged interlocking T-shaped muntin bars for use in a window, each T-shaped bar having a stem terminating in a rib portion, said joint structure including the rib portion of one of the interlocking bars being notched so as to receive the rib of the other bar and so notched as to provide a weld receiving pocket, the flanges of one bar extending through the joint of the bars, said continuous flanges being provided with substantially oppositely disposed C-shaped notches provided with bevelled walls, the flanges of the other bar being severed so as to provide shoulders abutting the uncut sides of the flanges of the first mentioned bar, the severed flanges being provided with a pair of arcuate openings arranged in spaced relation from each other and cooperating with the C-shaped notches to form substantially kidney-shaped pockets, said arcuate openings being provided with bevelled walls so that the kidney-shaped pockets are larger on the outside face of the flanges than on the inside thereof, a locking member for locking the bars, and fusing material seated in the pockets to hold the muntin bars in fixed relation relative to each other.

7. A joint structure for joining transversely arranged intersecting T-shaped muntin bars for use in a window, each of the T-shaped bars having a stem terminating in a rib portion, said joint structure including the rib portion of one of the interlocking bars being notched so as to receive the rib portion of the other bar, said notch being so formed as to provide a weld receiving pocket, the flanges of one bar continuing through the joint of the bars, the continuous flanges being provided with substantially oppositely disposed C-shaped notches provided with bevelled walls, the flanges of the other bar being severed so as to provide shoulders abutting the uncut sides of the flanges of the first mentioned bar, the ends of the severed flanges being provided with a pair of arcuate openings arranged in spaced relation from each other and cooperating with the C-shaped notches to form substantially kidney-shaped pockets, said arcuate openings being provided with bevelled walls so that the kidney-shaped pockets are larger on the outside face of the flanges than the inside thereof so as to provide dish-shaped cavities, and fusing material seated in the aforementioned pockets for welding the bars together.

W. D. BAYLEY.